(12) United States Patent  
Denson

(10) Patent No.: US 9,598,879 B2  
(45) Date of Patent: Mar. 21, 2017

(54) LOW COST ELECTRONIC KEY FINDER WITH LIGHT IMPINGING UPON PHOTODETECTORS ACROSS A SLOT AND AROUND KEY IN SLOT

(71) Applicant: Lutrell Denson, Philadelphia, PA (US)

(72) Inventor: Lutrell Denson, Philadelphia, PA (US)

(*) Notice: Subject to any disclaimer, the term of this patent is extended or adjusted under 35 U.S.C. 154(b) by 126 days.

(21) Appl. No.: 14/706,957

(22) Filed: May 7, 2015

(65) Prior Publication Data

US 2016/0326772 A1    Nov. 10, 2016

(51) Int. Cl.
*E05B 19/00* (2006.01)
*G01B 11/24* (2006.01)
*E05B 19/24* (2006.01)

(52) U.S. Cl.
CPC ...... *E05B 19/0088* (2013.01); *E05B 19/0011* (2013.01); *E05B 19/0017* (2013.01); *E05B 19/24* (2013.01); *G01B 11/24* (2013.01)

(58) Field of Classification Search
CPC ...... G06K 9/00; G06K 9/00422; G06F 21/34; G06F 3/0421; G01B 11/25; G01B 9/02069; G06T 15/04

USPC ... 250/559.2, 559.4, 559.44, 559.39, 559.36, 250/559.22, 221; 356/71, 389–392

See application file for complete search history.

(56) References Cited

U.S. PATENT DOCUMENTS

| 4,899,391 | A  |   | 2/1990 | Cimino et al. |
| 5,132,661 | A  | * | 7/1992 | Pinnow ................ E05B 49/006 340/5.28 |
| 6,064,747 | A  |   | 5/2000 | Wills et al. |
| 6,175,683 | B1 |   | 1/2001 | Sugimura et al. |
| 2005/0088282 | A1 |   | 4/2005 | Denson |

* cited by examiner

*Primary Examiner* — Que T Le
(74) *Attorney, Agent, or Firm* — LaMorte & Associates, P.C.

(57) ABSTRACT

A system for identifying a key to a lock. The system uses a simple scanner. Within the scanner, a plate is illuminated by at least one LED. Opposite the plate is positioned a matrix of photodetectors. The plate and the matrix of photodetectors are separated by a slot that is sized to receive the key. The matrix of photodetectors generates an electronic signal that is indicative of light from the plate that passes across the key in the slot. A memory is provided that stores known key signals. A processor is provided that compares the newly generated electronic signal to the known key signals in the memory to find a match. A display is provided for displaying information about which the key signals from memory is a match. In this manner, a person can identify the key.

17 Claims, 5 Drawing Sheets

LOW COST ELECTRONIC KEY FINDER WITH LIGHT IMPINGING UPON PHOTODETECTORS ACROSS A SLOT AND AROUND KEY IN SLOT

BACKGROUND OF THE INVENTION

1. Field of the Invention

In general, the present invention relates to electronic devices that scan a physical key for a lock and identifies the key by providing a user with information about the lock that the key opens.

2. Prior Art Description

Locks with keys have existed for hundreds of years. Locks are used on doors of homes, cars, bicycles, desk draws, and countless other applications. As such, it is not unusual for a person to have a key chain that holds several different keys. Over time people change locks, add locks, remove locks, change homes, and change cars. However, keys on a key chain are often overlooked. Consequently, many people carry keys on key chains that no longer have locks to open. Furthermore, many keys look similar to other keys. Consequently, many people cannot identify keys by sight. The result is that many people try a variety of keys in a lock before they finally find the proper key that opens the lock.

In many homes, there are a wide variety of orphan keys. Orphan keys can be found hanging on hooks, in dresser draws, in storage boxes and the like. People who find orphan keys rarely are able to identify the purpose of the key. However, they may be reluctant to throw away the key on the chance that the key may someday be needed.

In the prior art, there exist electronic devices that scan the shape of a key for some purpose. U.S. Pat. No. 6,175,683 describes a system that uses a scanner to capture a cross-sectional image so that a key can be reproduced by a locksmith. U.S. Pat. No. 4,899,391 discloses an automated key identification and matching system using a video camera to digitize the key images and a computer memory for storage. U.S. Pat. No. 6,064,747 discloses a means for identification of keys using a shadow image so that the key can be reproduced.

In U.S. Patent Application Publication No. 2005/0088282, the Applicant attempted to develop an electronic key identification system. However, the system developed had the same disadvantage as the other prior art systems. The disadvantage is that such prior art key identification systems required complex camera imaging and electronic components that made the key identification system expensive and complex to manufacture. In order for an electronic key identifier to be successful in the marketplace, it has to work effectively and has to have a manufacturing price point of only a few dollars.

A need therefore exists in the art for a low cost electronic key identifier that is accurate, yet is both easy and inexpensive to manufacture. This need is met by the present invention as described and claimed below.

SUMMARY OF THE INVENTION

The present invention is a low-cost system and method for identifying a key to a lock. The system uses a simple scanner. Within the scanner, a plate is internally illuminated by at least one LED. Opposite the plate is positioned a matrix of photodetectors. The plate and the matrix of photodetectors are separated by a slot that is sized to receive the key. The matrix of photodetectors generates an electronic signal that is indicative of light from the plate that passes across the key in the slot. As such, the electronic signal is indicative of the shadow of the key.

A memory is provided that stores known key signals. A processor is provided that compares the newly generated electronic signal to the known key signals in the memory to find a match. A display is provided for displaying information about which the key signals from memory is a match. In this manner, a person can identify the key.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention key identification system can be embodied in many ways, only a few exemplary embodiments have been selected for the purposes of illustration and discussion. The illustrated embodiments, however, are merely exemplary and should not be considered a limitation when interpreting the scope of the appended claims.

Figure 1:
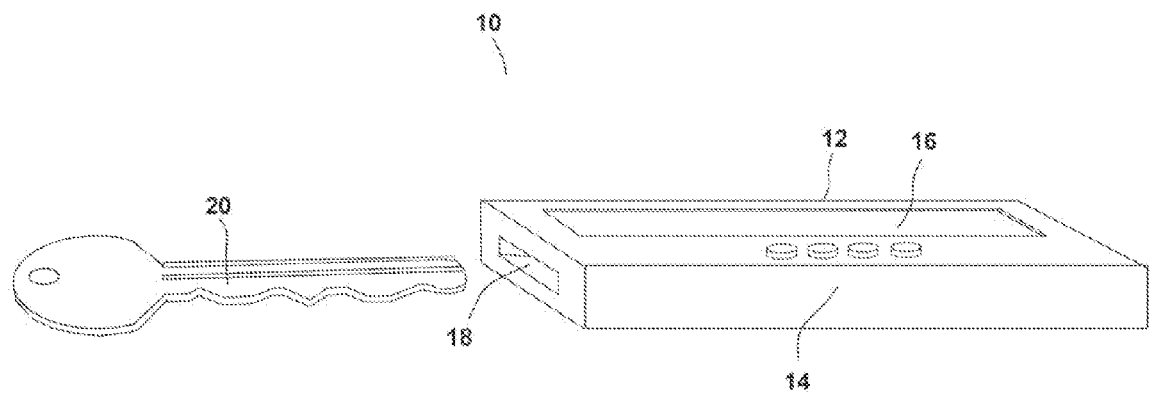
FIG. 1 is a perspective view of an exemplary embodiment of a scanner unit used to scan the shape of a key.
Figure 2:
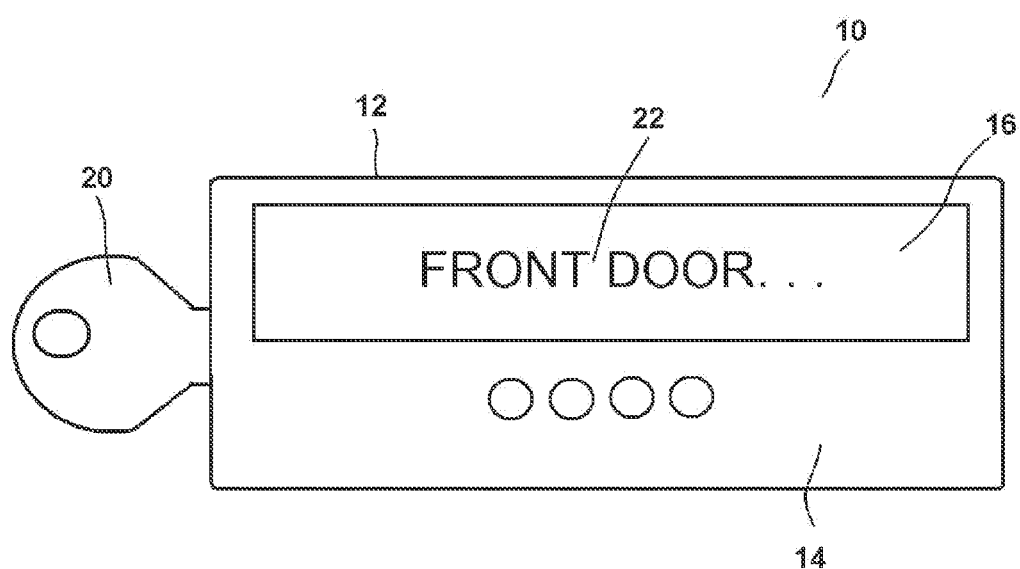
FIG. 2 shows the embodiment of FIG. 1 with a key inserted into the scanner unit.

Referring to FIG. 1 in conjunction with FIG. 2, a first embodiment of a key scanner system 10 is shown that is intended to be a self-contained electronic device. The key scanner system 10 includes a scanner unit 12. The scanner unit 12 is packaged in a housing 14 that has a display 16 and a key access port 18. A key 20 is inserted into the scanner unit 12 through the key access port 18. Within the scanner unit 12, the key 20 is scanned and the shape of the key 20 is converted into a corresponding digital signal. The digital signal is then compared to other digital codes that are stored in a memory. If a match is found, the key 20 is identified, using a textual identifier 22. The textual identifier 22 for the key 20 is then shown on the display 16.

Figure 3:
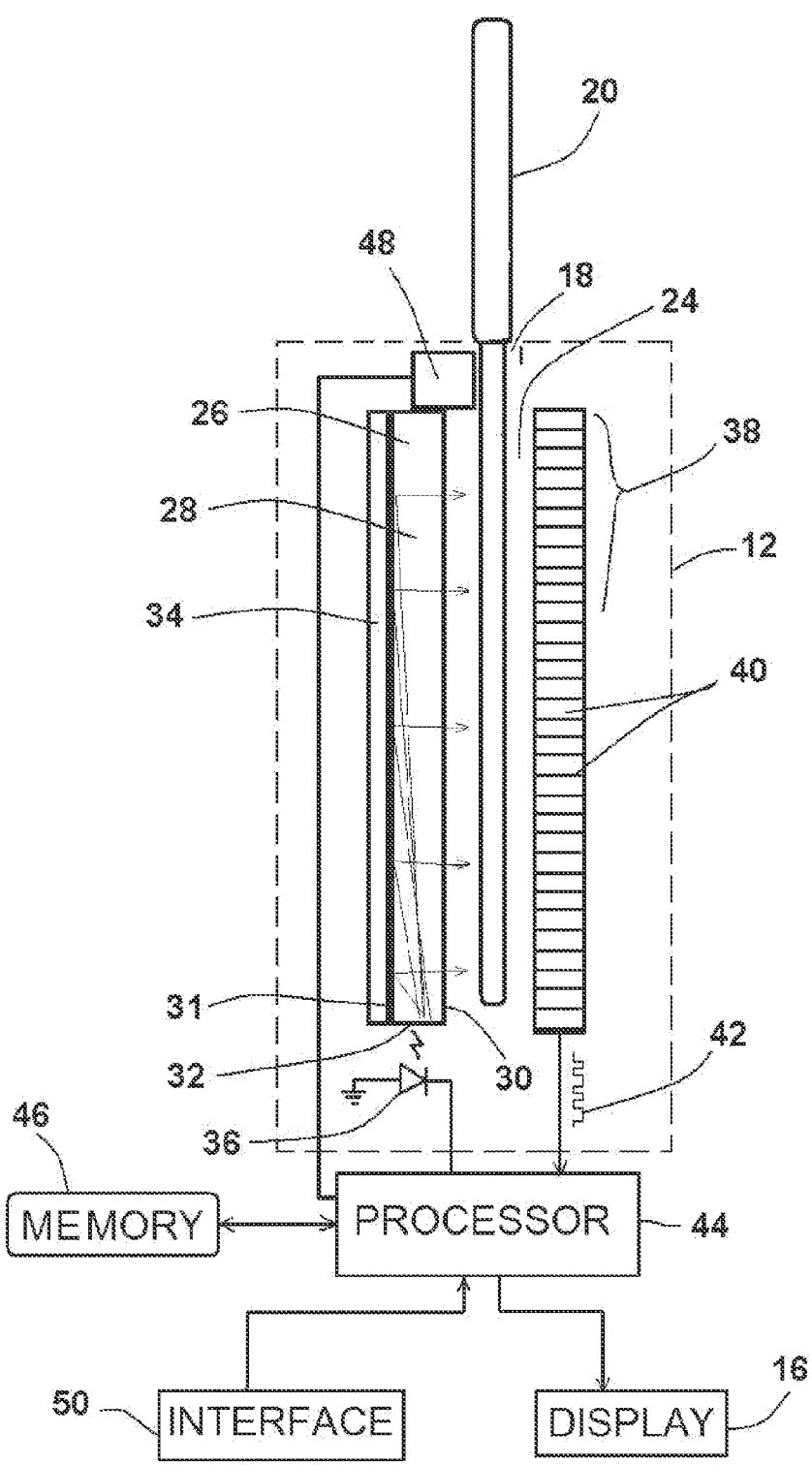
FIG. 3 is a schematic showing the electronic components of the key identification system.

Referring to FIG. 3, it will be understood that the scanner unit 12 can scan a key 20 and convert its profile into a digital electronic signal 42 in a very inexpensive manner. A slot 24 is present within the scanner unit 12. The key access port 18 leads into the slot 24. When a key 20 is placed into the scanner unit 12, the key 20 extends into the slot 24 through the key access port 18. An illuminated plate 26 is positioned on one side of the slot 24. The illuminated plate 26 consists of a rectangle of transparent or translucent material 28. The illuminated plate 26 has a front surface 30 that faces the slot 24, an opposite rear surface 31 that faces away from the slot 24, and side edges 32. The rear surface 31 is coated on one side with a reflective coating 34. The transparent/translucent material 28 can be glass, but is preferably an inexpensive piece of plastic. The reflective coating 34 is preferably a retroreflective film that is attached with a clear adhesive.

One or two low cost LEDs 36 are supplied. The LEDs 36 can be monochromatic, such as red or green LEDs, and as such, cost only pennies apiece. The LEDs 36 are positioned to shine light into the transparent/translucent material 28 though a side edge 32. This internally illuminates the transparent/translucent material 28, therein creating the illuminated plate 26. The reflective coating 34 prevents light from exiting the rear surface 31 and directs that light toward the front surface 30 of the illuminated plate 26. The front surface 30 of the illuminated plate 26 faces the slot 24. The result is a relatively even and constant source of light that shines along the length of the slot 24.

A low-resolution matrix 38 of photodetectors 40 is provided on the opposite side of the slot 24. The photodetector matrix 38 can have a resolution as low as twenty-five photodetectors 40 per square inch. However a resolution of 100 photodetectors 40 per square inch is preferred. The slot 24 has a cross-sectional area of between one and two square inches. As such, even at the higher resolution, the photodetector matrix 38 is very inexpensive.

Normally, the light being emitted by the illuminated plate 26 is received by the photodetector matrix 38 across the slot 24. However, when a key 20 is inserted into the slot 24, the presence of the key 20 shields different areas of the photodetector matrix 38, depending upon the shape of the key 20. Each key 20 leaves some of the photodetectors 40 in the matrix 38, open, blocked, and partially blocked. The combination is unique to the key. The photodetector matrix 38 produces an electrical signal 42 that corresponds to the various photodetectors 40 that are blocked, partially blocked and unblocked. Consequently, the signal 42 generated by the photodetector matrix 38 is unique for each key 20 that is inserted into the slot 24.

The signal 42 generated by the photodetector matrix 38 is read by a processor 44. The processor 44 has access to a memory 46. In the memory 46, a database of known key signals is stored along with a textual identifier for each. The processor 44 runs a simple comparison subroutine that compares a current signal 42 to the database of signals stored in the memory 46. If a match is found, the identity of the key 20 in the slot 24 becomes known. The textual identifier 22 (FIG. 2) corresponding to the key 20 is then displayed.

An activation switch 48 is positioned at the key access port 18. The activation switch 48 automatically activates the key identification system 10 when a key 20 is inserted into the slot 24 through the key access port 18.

The key scanner system 10 operates in two modes: which are a recording mode and an identification mode. In the recording mode, a key 20 is inserted into the scanner unit 12. This activates the scanner unit 12 and produces a signal 42 that corresponds to the shape of the key 20. The digital signal 42 can then be stored in the memory 46 with a textual identifier 22. The textual identifier 22 can be a name, such as "front door key", "bicycle lock key", "truck key" or the like. If the key identification system 10 is manufactured as a self-contained product, an interface 50 would be included on the scanner unit 12. The interface 50 enables a person to input the selected name of the key 20.

The second mode is the identification mode. In the identification mode, a key 20 of unknown purpose is inserted into the scanner unit 12. The scanner unit 12 produces a digital signal 42 that corresponds to the unknown key 20. The signal 42 is then compared to signals previously stored in the memory 46. If a match is found, the textual identifier 22 entered for the matching signal is displayed. The user will read the textual identifier 22, such as "front door key" and know the previously unknown purpose of the key 20.

The key scanning system 10 can be manufactured as a dedicated unit where the scanner unit 12, processor 44, memory 46, and display 16 are all manufactured into one unit. However, this need not be the case. The cost of the invention can be significantly lowered by integrating the key scanning system 10 with another handheld electronic device, such as a smart phone, tablet, or laptop computer.

Figure 4:
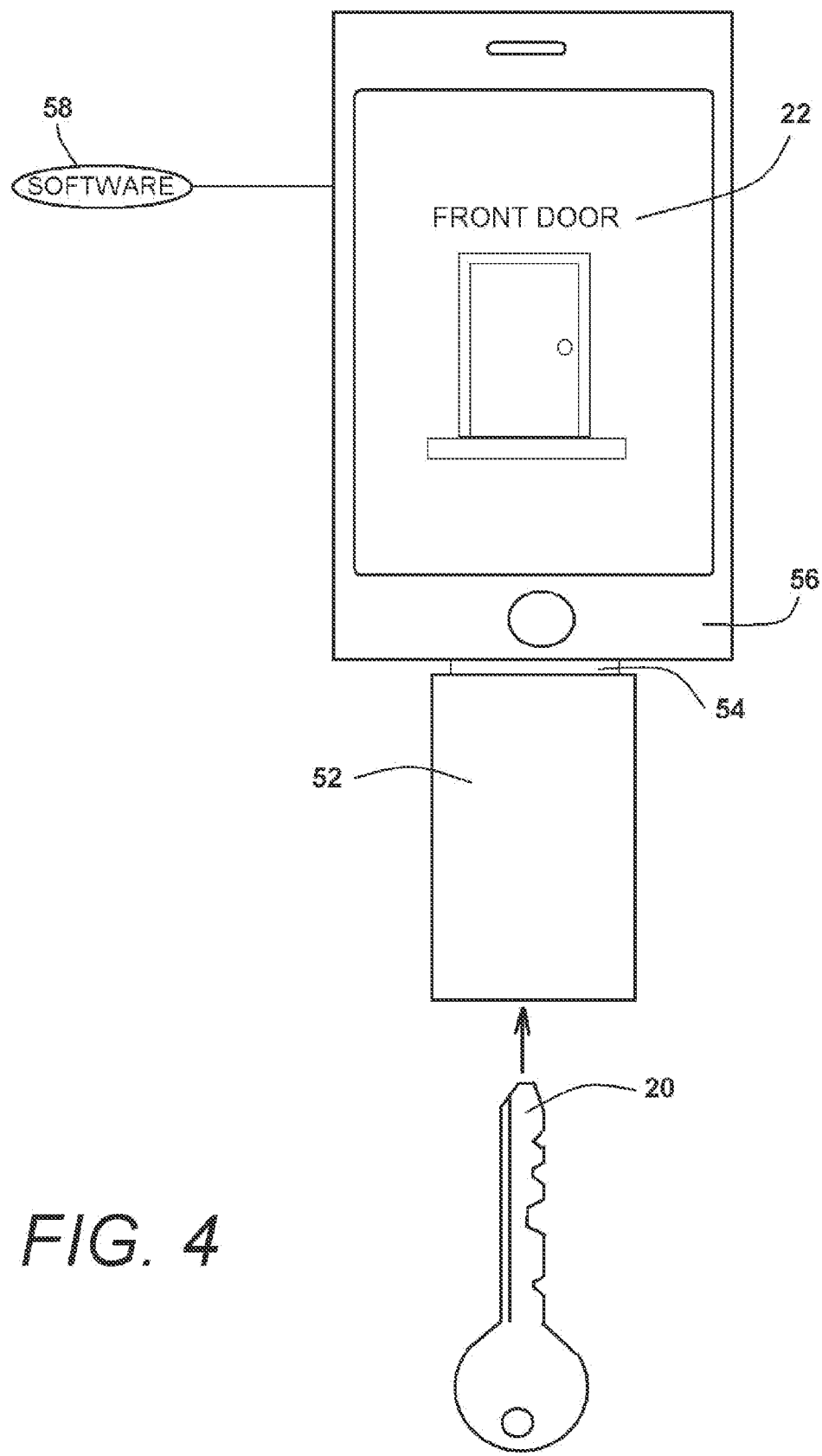
FIG. 4 is an alternate embodiment of the key identification system, wherein a scanner unit is joined to a prior art handheld electronic device.

Referring to FIG. 4, it can be seen that a simplified scanner unit 52 can be made with a data connector 54 that enables the simplified scanner unit 54 to exchange data with a handheld electronic device 56, such as a smart phone. The handheld electronic device 56 contains a processor capable of running a software application 58.

In this embodiment, the simplified scanner unit 52 contains the previously described components needed to generate a digital signal that corresponds to the shape of a key 20 inserted into the simplified scanner unit 52. The digital signal is read to the handheld electronic device 56. Running the software application 58, the handheld electronic device 56 compares the digital signals to other digital signals stored in memory. If a match is found, the textual identifier 22 for the key 20 is displayed on the display 60 of the handheld digital device 56. The textual identifier 22 may be enhanced and may include an actual picture of the lock location.

Since the handheld electronic device 56 can connect to communication networks, such as the world wide web and cellular networks, the memory of the system can be shared by multiple users. In this manner, a key 20 can be checked against a memory that contains inputs from many members of the same family or many members of the same company.

Figure 5:
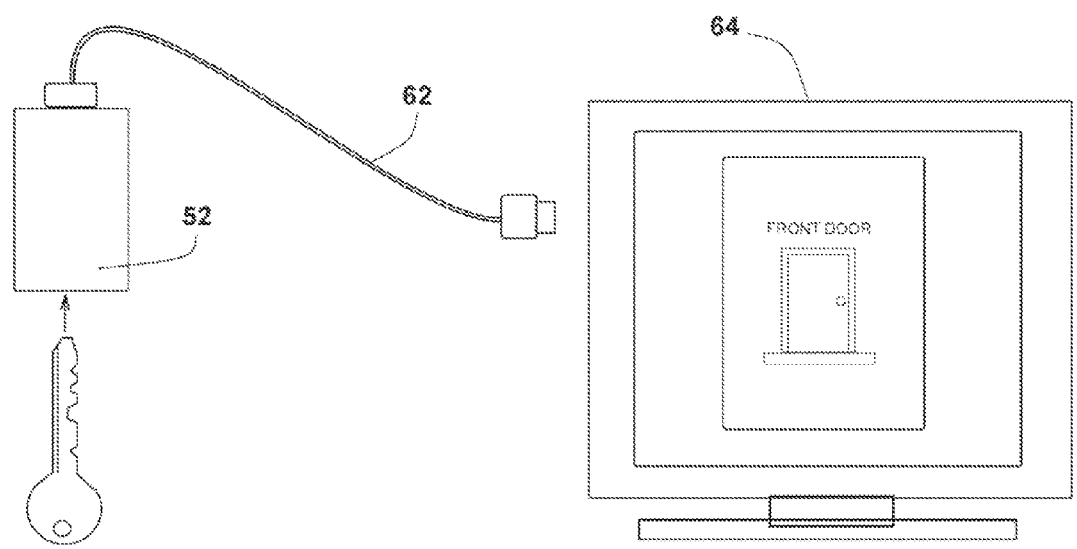
FIG. 5 is an alternate embodiment of the key identification system, wherein a scanner unit is joined to a prior art computer via a cable connection.

Referring to FIG. 5, it will be understood that the simplified scanner device 52 can be sold with a USB cable 62 that enables the simplified scanner device 52 to be interconnected with a computer 64, wherein the computer 64 in the same manner as the handheld electronic device 56 previously described.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. A system for identifying a key to a lock, comprising:
a plate that is internally illuminated by at least one LED;
a matrix of photodetectors positioned proximate said plate, wherein said plate and said matrix of photodetectors are separated by a slot that is sized to receive the key, and wherein said matrix of photodetectors generates an electronic signal indicative of light from said plate impinging upon said matrix of photodetectors across said slot and around any key positioned in said slot;
a memory that stores known key signals;
a processor that compares said electronic signal to said known key signals to find a match; and
a display for displaying which of said key signals is a match.

2. The system according to claim 1, further including a switch that automatically activates said plate when a key is inserted into said slot.

3. The system according to claim 1, wherein said plate has a front surface that faces said slot and an opposite rear surface that faces away from said slot.

4. The system according to claim 1, wherein said rear surface is covered with a reflective material.

5. The system according to claim 1, wherein said matrix of photodetectors has a definition of between 25 and 100 photodetectors per square inch.

6. The system according to claim 1, wherein said plate, said matrix of photodetectors and said slot are retained in a housing that has an access opening for accessing said slot with an inserted key.

7. The system according to claim 6, further including a port for interconnecting said housing to an external computer, wherein said external computer receives said electronic signal through said port.

8. The system according to claim 7, wherein said memory, said processor and said display are part of said external computer.

9. A system for scanning a key to a lock, comprising:
an illuminated plate;
photodetectors positioned proximate said plate, wherein said plate and said photodetectors are separated by a slot that is sized to receive the key, and wherein said photodetectors generate an electronic signal indicative of light from said plate that impinges upon said photodetectors across said slot and around any key positioned in said slot, wherein said photodetectors generate an electronic signal that corresponds to any key positioned in said slot.

10. The system according to claim 9, further including a memory that stores known key signals that identify keys.

11. The system according to claim 10 further including a processor that compares said electronic signal to said known key signals to find a match.

12. The system according to claim 11, further including a display controlled by said processor.

13. The system according to claim 9, further including a switch that automatically activates said illuminated plate when a key is inserted into said slot.

14. The system according to claim 9, wherein said illuminated plate is internally illuminated and has a front surface that faces said slot and an opposite rear surface that faces away from said slot.

15. The system according to claim 14, wherein said rear surface is covered with a reflective material.

16. The system according to claim 9, wherein said photodetectors are set in a matrix.

17. The system according to claim 9, further including a port for interconnecting said photodetectors to an external computer, wherein said external computer receives said electronic signal through said port.

* * * * *